United States Patent
Harada

Patent Number: 5,415,743
Date of Patent: May 16, 1995

[54] FABRICATION OF FERROELECTRIC DOMAIN REVERSALS

[75] Inventor: Akinori Harada, Kanagawa, Japan

[73] Assignee: Fuji Photo Film Co., Ltd., Kanagawa, Japan

[21] Appl. No.: 25,655

[22] Filed: Mar. 3, 1993

[30] Foreign Application Priority Data

| Mar. 3, 1992 | [JP] | Japan | 4-045494 |
| Oct. 28, 1992 | [JP] | Japan | 4-290004 |
| Oct. 28, 1992 | [JP] | Japan | 4-290005 |
| Feb. 9, 1993 | [JP] | Japan | 5-021152 |

[51] Int. Cl.6 .................................. G02F 1/00
[52] U.S. Cl. .......................... 204/130; 204/164; 372/22; 385/122
[58] Field of Search ............... 204/130, 164; 372/22; 385/122

[56] References Cited

U.S. PATENT DOCUMENTS 4,927,220  5/1990  Hesselink et al. ............... 350/3.64
5,036,220  7/1991  Byer et al. ......................... 307/427

OTHER PUBLICATIONS

"Milliwatt-order blue-light generation in a periodically domain-inverted LiTaO3 waveguide" Optics Letters vol. 16, No. 15, Aug. 1, 1991, pp. 1156–1158.

"Fabrication of periodic domain grating in LiNbO3 by electron beam writing for application of nonlinear optical processes" Electronics Letters vol. 27, No. 14, Jul. 4, 1991, pp. 1221–1222.

"Interactions between light waves in a nonlinear dielectric" Physical Review, vol. 127, No. 6, Sep. 15, 1962 pp. 1918–1938.

Primary Examiner—John Niebling
Assistant Examiner—Arun S. Phasge
Attorney, Agent, or Firm—Sughrue, Mion, Zinn, Macpeak & Seas

[57] ABSTRACT

A fabrication method in which periodic domain reversals of large area are formed deeply, under improved control, over a ferroelectric which possesses the nonlinear optical effect. Proton-exchanged regions are prepared in a predetermined pattern on a unipolarized MgO-LiNbO3 substrate. An electric field is applied to these proton-exchanged regions from a high voltage power supply via a corona wire while it is subjected to a heat treatment by a heater, thereby fabricating local domain reversals.

17 Claims, 10 Drawing Sheets

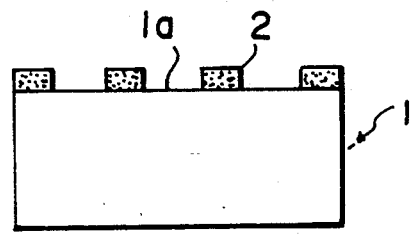
F I G. 1A
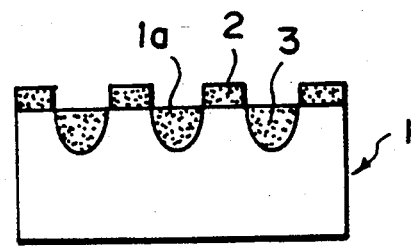
F I G. 1B
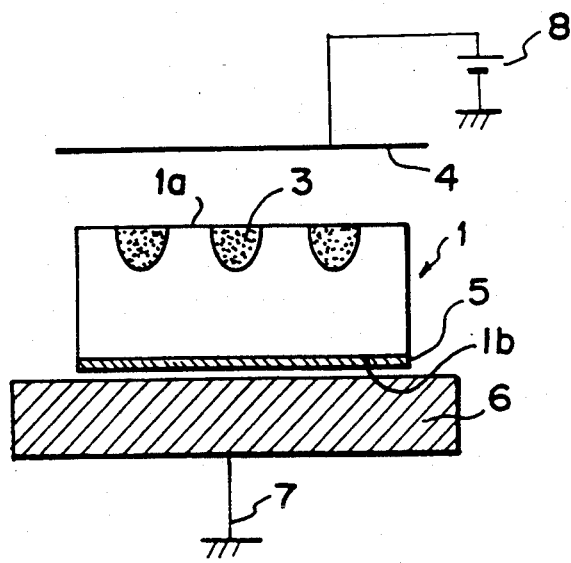
F I G. 1C
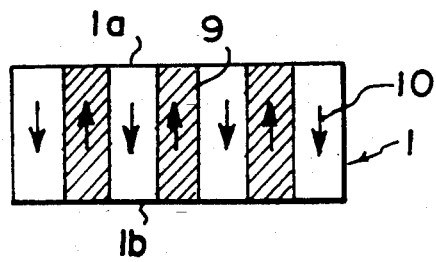
F I G. 1D

FABRICATION OF FERROELECTRIC DOMAIN REVERSALS

BACKGROUND OF THE INVENTION

1. Field of the Invention

This invention relates to an optical wavelength converter element for converting a fundamental wave to a second harmonic wave, and more particularly to a method for forming domain reversals in a predetermined pattern on a ferroelectric possessing the nonlinear optical effect, in order to fabricate an optical wavelength converter element having periodic domain reversals.

2. Description of the Prior Art

There has already been proposed by Bleombergen et al. in Physics Review vol. 127, No. 6 in 1918 (1962), in which the wavelength of a fundamental wave is converted into a second harmonic wave using an optical wavelength converter element with regions (domains) where the directions of spontaneous polarization of a ferroelectric, possessing the non-linear optical effect, are periodically switched.

In this method, the fundamental wave can be phase-matched with the second harmonic wave by setting the period A of the domain reversals to be an integral multiple of the coherent length $\Lambda c$ which is given by $$\Lambda c = 2\pi / \{\beta(2\omega) - 2\beta(\omega)\} \quad (1)$$

where $\beta(2\omega)$ designates the propagation constant of the second harmonic wave, and $2\beta(\omega)$ represents the propagation constant of the fundamental wave. When wavelength conversions are effected using the bulk crystal of a nonlinear optical material, a wavelength to be phase-matched is limited to the specific wavelength inherent to the crystal. However, in accordance with the above-described method, a phase matching can be realized effectively by selecting a period $\Lambda$ satisfying the condition (1) for an arbitrary wavelength.

Examples of the known fabrication method for such a periodic domain reversals include 1) the method proposed by K. Yamamoto, K. Mizuuchi, and T. Taniuchi in Optics Letters. Vol. 16, No. 15, pp. 1156 (1991) wherein the $-z$ surface of LiTaO$_3$ is periodically subjected to proton-exchanges, and a resultant structure undergoes a heat treatment around the Curie temperature; and 2) the method proposed by H. Ito, C. Takyu, and H. Inaba in Electronics Letters, vol. 27, No. 14, pp. 1221 (1991), wherein electron beams are directly radiated onto the $-z$ surface of LiTaO$_3$ or LiNbO$_3$ at room temperature.

In connection with the practice of the first method, there is also proposed that a waveguide type optical wavelength converter element be fabricated by forming, employing proton exchanges, channel waveguides on preliminarily prepared third-order periodic domain reversals. When this optical wavelength converter element is observed in cross section, it turns out that hemicyclic periodical domain reversals are formed. When a Ti:Al$_2$O$_3$ laser is used as the light source of a fundamental wave, there is outputted a second harmonic wave of 2.4 mW in response to a fundamental wave input of 99 mW, thereby achieving a wavelength conversion efficiency approximate to theoretical values at the third-order period.

In the meantime, the optical wavelength converter element, which is fabricated in accordance with the second method, is provided with periodic domain reversals extending, from one end to the other, in the thicknesswise direction of the LiNbO$_3$ substrate (e.g. about 0.5 mm in width), that is, extending through the substrate from the $-z$ surface to the $+z$ surface. Thus, this type of element can find applications as a bulk type wavelength converter element. In the optical wavelength converter element with the third-order periodic domain reversals, fabricated in accordance with the above technique, phase matching is observed in the bulk by the wavelength sweep of a Ti:Al$_2$O$_3$ laser.

In the case of the waveguide type optical wavelength converter element, in order to obtain a second harmonic wave at a practical level of several milliwatts using a semiconductor laser of a single lateral mode which has an output of about 100 mW as a fundamental wave light source, it is necessary to attain an improved wavelength conversion efficiency which is about one order higher than the third-order periodic structure by forming first-order periodic domain reversals.

In the aforementioned first method, since the domains have been reversed by a space-charge electric field developed in proton-exchanged regions during the heat treatment, the depth of the domain reversal is as shallow as about 1.6 $\mu$m at a first-order micro period of 3.6 $\mu$m. As a result of this, the domain reversals are formed considerably less deep than the thickness of a waveguide, which is generally of about 2.4 $\mu$m, thereby hindering the increase of the overlap integral between the fundamental wave and the domain reversals, and eventually achieving only the efficiency which is nearly twice that of the third-order periodic structure. Another drawback of the first method lies in that the proton-exchanged regions will probably be dispersed unless the optical wavelength converter element is immediately heated up to a temperature of about 500°–600° C., that is the temperature of the heat treatment. This makes the first method difficult with respect to reproducibility.

Contrary to this, the second method enables domain reversals to be manufactured deeply enough to reach the rear end of the substrate, but this method is admittedly inferior in the control of the domain reversals. Due to the capacity of an electron beam annealing system, the area that is exposed to radiations at one time is restricted to an area measuring about 2×2 mm. In order to improve the wavelength conversion efficiency by elongating the interactive length between the element and the fundamental wave, the periodic domain reversals should be interconnected with one another accurately, but the accuracy of the interconnection is admittedly difficult to ensure. This second method is also disadvantageous in that the use of the SEM, which requires a long time to scan across a wide area, hinders the improvement of the productivity of the elements.

SUMMARY OF THE INVENTION

In view of the foregoing observations and descriptions, the principle object of this invention is to provide a fabrication method for ferroelectric domain reversals, which allows periodically segmented domain reversals of large area to be fabricated easily and deeply with improved control.

Another object of this invention is to provide an optical wavelength converter element which is enhanced in the optical wavelength conversion efficiency to a much greater extent, and which can be used as a bulk crystal type optical wavelength converter element.

To these ends, according to one aspect of this invention, there is provided a fabrication method for ferroelectric domain reversals comprising the steps of:
   forming a proton-exchanged region in a predetermined pattern on a ferroelectric which possesses the unipolarized nonlinear optical effect; and
   heating the proton-exchanged region with the application of an electric field from the outside, thereby fabricating local domain reversals.

According to a second aspect of this invention, there is provided a fabrication method for ferroelectric domain reversals comprising the steps of:
   forming a Ti-diffused region in a predetermined pattern on a ferroelectric which possesses the unipolarized nonlinear optical effect; and
   heating the Ti-diffused region with the application of an electric field from the outside, thereby fabricating local domain reversals.

Moreover, according to a third aspect of this invention, there is provided a fabrication method for ferroelectric domain reversals comprising the steps of:
   forming an outer diffused region in a predetermined pattern on a ferroelectric possessing the unipolarized nonlinear optical effect; and
   heating the outer diffused region with the application of an electric field from the outside, thereby fabricating local domain reversals.

According to a fourth aspect of this invention, there is provided a fabrication method for ferroelectric domain reversals comprising the steps of:
   implanting ions or atoms in a predetermined pattern into a ferroelectric, from one end surface thereof, which possesses the unipolarized nonlinear optical effect, so that the electric conductivity of the implanted region is changed; and
   locally inverting the directions of polarization at the implanted region or the remaining region by applying an electric field to the intermediate region sandwiched between the implanted surface and the other opposite end surface.

According to a fifth aspect of this invention, there is provided a fabrication method for ferroelectric domain reversals comprising the steps of:
   irradiating light, at the wavelength enough to induce the photo refractive effect, in a predetermined pattern over a ferroelectric which possesses the unipolarized nonlinear optical effect and the photorefractive effect; and
   transforming the region, where the photorefractive effect appears, into local domain reversals by applying an electric field from the outside.

In a preferred mode, a corona electrical discharging technique may be employed for the application of an electric field to the ferroelectric.

In another preferred mode, in order to apply an electric field to the ferroelectric, electrodes should preferably be formed on opposite end surfaces of the ferroelectric, and a d.c. voltage or a pulse voltage may be applied to the ferroelectric through the electrodes.

In a still another preferred mode, in order to apply an electric field to the ferroelectric, the ferroelectric should preferably be subjected to a rapid cooling after it has been heated, and then an electric field applied to the ferroelectric utilizing surface electric charges produced by the pyroelectric effect.

According to a sixth aspect of this invention, there is provided a fabrication method for ferroelectric domain reversals comprising the steps of:
   forming an electrode in a predetermined pattern on one surface of a ferroelectric which possesses the unipolarized nonlinear optical effect;
   subjecting the ferroelectric to a corona electrical charging by means of the electrode and a corona wire disposed on the other opposite surface side of the ferroelectric;
   applying an electric charge to the region having undergone the corona electrical charging; and
   transforming the region occupied by the electrode of the ferroelectric into local domain reversals.

According to a seventh embodiment of this invention, there is provided a fabrication method for ferroelectric domain reversals comprising the steps of:
   forming an electrode in a predetermined pattern on one surface of a ferroelectric which possesses the unipolarized nonlinear optical effect;
   rapidly cooling the ferroelectric after the ferroelectric has been heated with the electrode thereof grounded; and
   transforming the region occupied by the electrode of the ferroelectric into local domain reversals by applying an electric field to the ferroelectric utilizing surface electric charges resulting from the pyroelectric effect.

According to an eighth embodiment of this invention, there is provided a fabrication method for ferroelectric domain reversals in which local domain reversals are formed by applying an electric field from the outside onto a ferroelectric having the unipolarized nonlinear optical effect, the method characterized in that
   an electric field is applied to the ferroelectric in dry atmosphere or under vacuum.

In a preferred embodiment of this invention, a MgO—LiNb$_x$Ta$_{(1-x)}$O$_3$ ($0 \leq X \leq 1$) substrate should be used as the ferroelectric.

In a preferred embodiment of this invention, the ferroelectric should be heated at a temperature less than the Curie point after local domain reversals have been formed on the ferroelectric.

In another preferred embodiment of this invention, an LiNbO$_3$ substrate or a MgO-LiNbO$_3$ substrate should be used as the ferroelectric, and this ferroelectric should be subjected to the heat treatment set forth above at temperatures between 100°–700° C.

In a still another preferred embodiment of this invention, a LiTaO$_3$ substrate should be used as the ferroelectric, and this ferroelectric should be subjected to the heat treatment set forth above at temperatures between 100°–600° C.

With respect to the first to third aspects of this invention, the application of an electric field to the proton-exchanged region, Ti-diffused region, and external-exchanged region formed in the ferroelectric while these regions are heated to form domain reversals, causes the domain reversals to be grown along the electric field. This is also true of the methods according to the other aspects of this invention, and hence domain reversals grow along the electric field.

This enables the domain reversals to be formed much more deeply than ever, and the wavelength conversion efficiency of the domain reversals to be improved sufficiently by securing a large overlap integral between the domain reversals and the fundamental wave. When the domain reversals are formed thus deeply, the domain reversals may be extended to the other end of the ferroelectric substrate without inconsistencies in the cross-sectional view thereof, thereby improving the periodic accuracy of the domain reversals to a much greater extent. This method is facilitated, in view of processing, when compared with the electron beam anneal technique, and allows the fabrication of domain reversals of large area at one time, which leads to the method being superior in productivity.

According to the method defined in the fourth aspect of this invention, two types of regions are defined in a predetermined pattern; namely, one type of region where ions or atoms are implanted into the ferroelectric, and another type of region which is free of implanted ions or atoms. These two types of regions are different from each other in electric conductivity. Hence, when directions of polarization are inverted by applying an electric field in the manner as mentioned above, the polarization direction of only the implanted region will be reversed if the electric conductivity of the implanted region is dropped, or otherwise, the polarization direction of only the remaining region will be reversed if the electric conductivity of the implanted region is increased. As a result of this, domain reversals are formed alternately with another in a predetermined pattern.

If the ion or atom implanted region is not formed deeply at the outset, these regions grow along the electric field arising from the application of the electric field, and eventually grow deeply enough to pass through the ferroelectric. Therefore, the ion or atom implanted region and the remaining region are definitely distinguished from each other in the thickness-wise direction of the ferroelectric. With such an arrangement, domain reversals to be formed, in the ion or atom implanted region or the remaining region, can grow sufficiently deep under improved control.

According to the study conducted by the inventors of this invention, a poorly controlled period or depth of the domain reversals can be partially ascribed to the fact that the surface resistance of the ferroelectric, during the application of an electric field, becomes uneven owing to humidity in the atmosphere.

In order to avoid this, an electric field is applied to the ferroelectric in dry atmosphere or under vacuum, as a result of which the surface resistance of the ferroelectric is prevented from being rendered uneven, and periodic domain reversals can be formed under enhanced control.

In addition, the foregoing heat treatment to the ferroelectric eliminates local variations in refractive index. By virtue of this, dispersions and diffractions occur to a lesser extent, and hence optical losses are suppressed to a smaller extent. If an optical wavelength converter element incorporating these domain reversals is disposed inside a laser cavity resonator, internal losses of the cavity resonator will be reduced to a smaller extent, and a second harmonic wave will be generated efficiently.

In accordance with the aforementioned fabrication techniques of this invention, channel optical waveguides, for instance, can be formed after first-order periodic domain reversals have been fabricated, so that the interactive length between the optical waveguide and the domain reversals is ensured to be long enough, thereby enabling the fabrication of a highly efficient waveguide type optical wavelength converter element which uses a laser diode, or the like, as a fundamental wave light source. Moreover, according to the fabrication techniques of this invention, since the domain reversals are fabricated much more deeply, it also becomes possible to fabricate an optical wavelength converter element to be accommodated in a solid-state laser pumped by a laser diode, or an external resonator type bulk crystal optical wavelength converter element.

BRIEF DESCRIPTION OF THE DRAWINGS

FIGS. 1A to 1D schematically show the fabrication of periodic domain reversals according to the fabrication method of a first embodiment;

DESCRIPTION OF THE PREFERRED EMBODIMENTS

Figure 2:
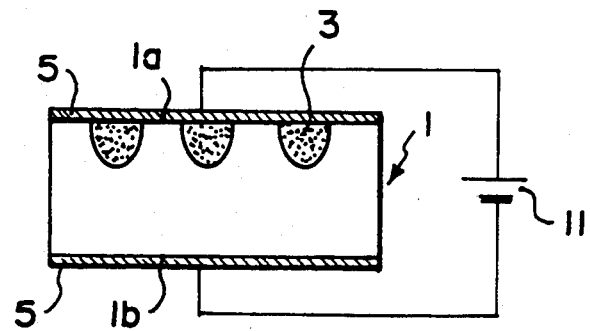
FIG. 2 schematically shows an example of an electric field applying means.

Referring to the accompanying drawings, the embodiments of this invention will be described in detail hereinbelow.

FIRST EMBODIMENT

With reference to FIGS. 1A to 1D, a first preferred embodiment of this invention will be described.

In the drawing, the reference numeral 1 designates a MgO-LiNbO$_3$ substrate which is a ferroelectric possessing the nonlinear optical effect. This substrate is subjected to a unipolarizing treatment, and is formed to a thickness of 0.5 mm. This substrate is also optically ground on the z surfaces thereof so that the largest nonlinear optical material constant $d_{33}$ can be effectively utilized. A Ta thin film having a thickness of 50 nm is deposited on the $-z$ surface 1a of the substrate 1 by sputtering a metal Ta, and a Ta mask 2 is formed in an alternate pattern shown in FIG. 1A by the photolithography and dry etching. The period $\Lambda$ of this alternate pattern is set to be 4 $\mu$m with allowances for the wavelength dispersion of the diffractive index of MgO—LiNbO3 so that a first-order period can be defined around 880 nm in the direction of the x axis of the substrate 1.

The substrate 1 then undergoes a proton exchange treatment in pyrophosphate for 15 minutes at a temperature of 230° C., thereby preparing a periodic proton exchanged region 3 at a thickness of 0.5 $\mu$m as shown in FIG. 1B. After the proton exchange treatment, the Ta mask 2 is removed by an etchant which is a mixture of NaOH and $H_2O_2$.

In order to obtain an even electric potential during the application of an electric field, which will be discussed later, a metal Pt 5 is deposited on the +z surface at the rear end of the substrate by the electron beam evaporation. The sample thus prepared is then heated up to a temperature of 200° C. by means of a heater 6 which is connected to the earth 7 as shown in FIG. 1C. The sample is also applied with an electric field by the corona electrical charging. At this time, the distance between a corona wire 4 and the substrate 1 is set to 10 mm, and a voltage of $-5$ kV is applied from a high voltage power supply 8 to the substrate for 10 minutes by way of the corona wire 4. After the above treatment, the metal Pt 5 deposited on the +z surface 1b is then removed. The substrate is then sliced along the y surface thereof, and then subjected to a selective etching using an etchant which is a mixture of HF and $HNO_3$ at a ratio of 1:2 after it has been ground.

When the substrate 1 is observed in cross section (from the y surface thereof), it turns out that periodic domain reversals 9 are formed in the proton-exchanged region 3, wherein the periodic domain reversals extend through the substrate from the $-z$ surface to the $+z$ surface, and are spaced at periods of $\Lambda=4$ $\mu$m as shown in FIG. 1D. In this drawing, an arrow 10 designates the direction of polarization.

When a channel waveguide is formed after the preparation of the periodic domain reversals, the substrate is annealed at a temperature of, e.g., 400° C. for four hours in order to prevent variations in refractive index of the proton-exchanged region from affecting propagation losses in the waveguide by averaging the diffractive index.

SECOND EMBODIMENT

A second preferred embodiment of this invention will now be described. In this embodiment, as with the first embodiment, a MgO—LiNbO3 is employed as a ferroelectric. First, a mask pattern, having the same period as the first embodiment, is prepared on the +z surface of the substrate by the photolithography. A Ti thin film is then formed at a thickness of 65 nm by sputtering a metal Ti, and the film is removed to form a periodic pattern of Ti. This substrate is subjected to a Ti diffusing treatment at a temperature of 1035° C. for ten hours in a wet atmosphere of oxygen, thereby preparing a periodic Ti diffused region.

In the same fashion as the first embodiment, during the heat treatment, the sample undergoes the corona electrical charging while being heated, so that the Ti-diffused region turns into periodic domain reversals. When the substrate is viewed in cross section along the y surface thereof, it turned out that the domain reversals extended deeply enough to pass through the substrate.

THIRD EMBODIMENT

A third embodiment of this invention will be described hereunder. As with the preceding embodiments, the MgO-LiNbO3 is used as a ferroelectric. $SiO_2$ is deposited on the +z surface of the substrate by the sputtering, thereby preparing a $SiO_2$ thin film having a thickness of 100 nm. A $SiO_2$ mask pattern with the same period as the first embodiment is prepared by means of the photolithography and dry etching. This pattern is then heated in an atmosphere of oxygen at a temperature of 1100° C., thereby preparing a periodic outer diffused region of Li.

After the deposition of Pt in the same manner as the first embodiment, the sample is subjected to the corona electrical charging while being heated, so that the Li outer diffused region turns into periodic domain reversals. When the substrate is viewed in cross section along the y surface thereof, it turns out that the domain reversals are formed deeply enough to pass through the substrate.

Other than the application technique of an electric field as mentioned in the first to third embodiments, another technique may be employed wherein metal Pt 5 is deposited on both surfaces of the substrate 1, that is, on the $-z$ surface 1a and the $+z$ surface 1b as shown in FIG. 2, to form an electrode and wherein a d.c. voltage or a pulse voltage is applied to the substrate via the electrodes from a power supply 11. Like reference numerals designate like features throughout the drawings, and the explanation thereof is omitted here for clarity. Moreover, the ferroelectric material, that is, the MgO-LiNbO3 used in the foregoing embodiments, may be replaced with LiTaO3, LiNbO3, or the like.

In the fabrication method for ferroelectric domain reversals, according to this invention, it is considered that the proton exchange, the diffusion of Ti, or the external diffusion of Li causes the Curie temperature and electric conductivity of the ferroelectric to be varied relative to the bulk crystal of the ferroelectric, and that the heat treatment of the substrate with the application of an electric field leads to the selective fabrication of very deep domain reversals.

Figure 3:
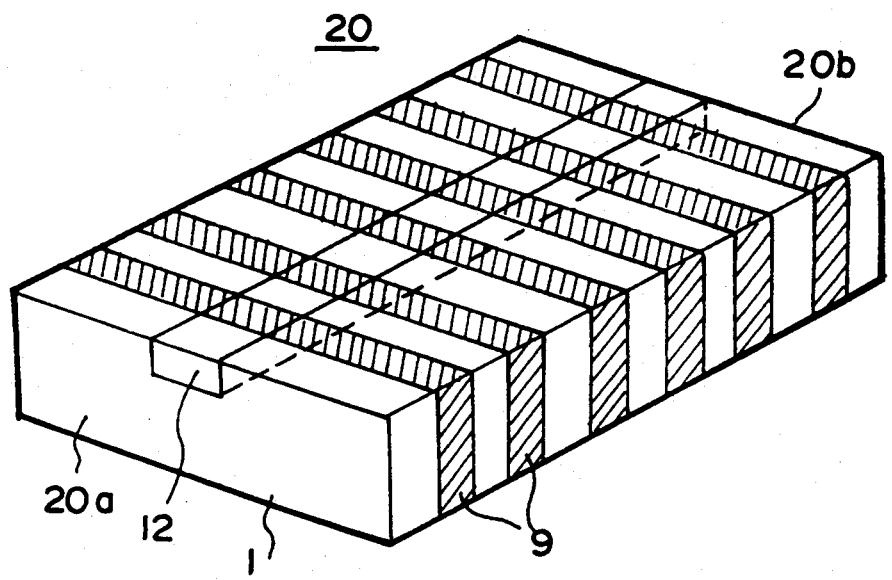
FIG. 3 is a perspective view showing a waveguide type optical wavelength converting element with periodic domain reversals.

A waveguide type optical wavelength converter element, which uses the first-order periodic domain reversals prepared in the first embodiment, is now explained. FIG. 3 schematically illustrates the structure of this wavelength converter element. After the fabrication of the periodic domain reversals 9 on the substrate 1 in the same manner as in the first embodiment, a channel waveguide 12 is so formed that light will propagate along the x axis of the substrate. This channel waveguide is fabricated in the manner as will be described below.

Namely, after the preparation of a Ta thin film, having a thickness of 50 nm, by sputtering a metal Ta onto the $-z$ surface of the substrate 1, a mask pattern having a width of 4 $\mu$m is formed by means of the photolithography and dry etching. This substrate 1 is then subjected to a proton exchange treatment in pyrophosphate for 15 minutes at a temperature of 230° C. The Ta mask is then removed by an etchant which is a mixture of NaOH and $H_2O_2$, and is annealed for 5 minutes at a temperature of 300° C., thereby fabricating a channel waveguide 12. Finally, the entry end 20a and the exit end 20b of the channel waveguide type optical wavelength converter element 20 are ground.

When a laser beam at a wavelength of λ is introduced into the entry end 20a as a fundamental wave, a phase matching in the waveguide-waveguide mode is effected, and a second harmonic wave at a wavelength of λ/2 exits from the output end 20b efficiently.

Figure 4:
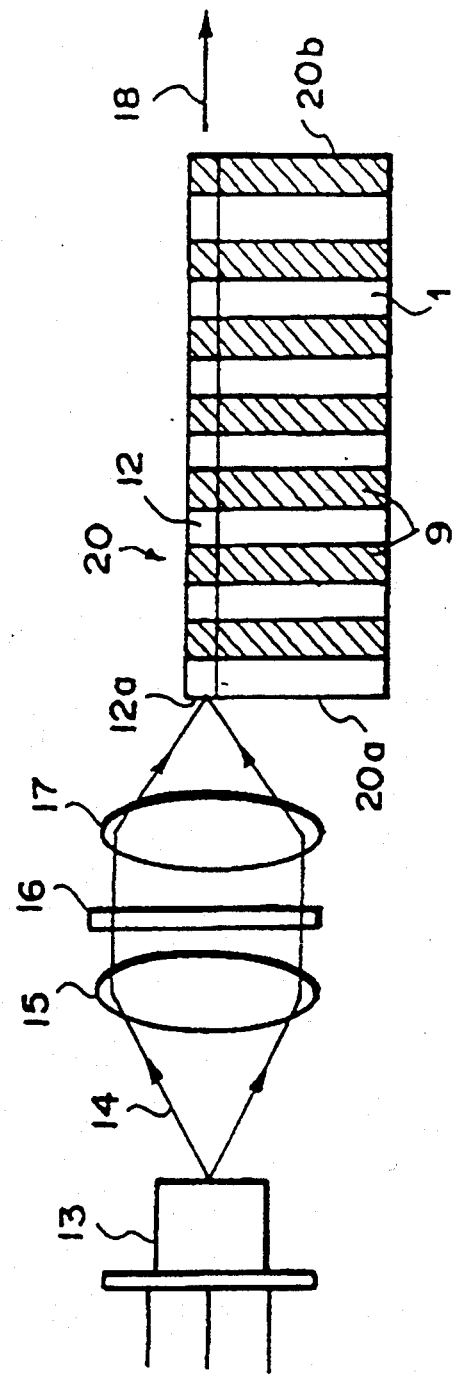
FIG. 4 is a schematic side elevation view illustrating the optical wavelength converter element, shown in FIG. 3, when it is in use.

As one example, a waveguide type optical wavelength converter element, which uses a laser diode as a fundamental wave light source, will be described with reference to FIG. 4. A laser beam 14 at a wavelength of 880 nm, which is emanated from the laser diode 13 as the fundamental wave, is collimated by means of a collimating lens 15, and then polarized and aligned to the z axis of the channel waveguide 12 by the λ/2 plate 16. This polarized wave is then collected by a condensing lens 17, and converged to the end surface 12a of the channel waveguide 12. Thus, the fundamental wave 14 enters and propagates through the channel waveguide 12.

The fundamental wave 14, which travels through the channel in the waveguide mode, is phase-matched in the periodic domain reversals in the waveguide 12, as a result of which the wavelength of the fundamental wave is converted to a second harmonic wave 18. This second harmonic wave 18 also propagates through the channel waveguide 12 in the waveguide mode, and efficiently exits from the output end 20b. The second harmonic wave 18 appearing from the output end is also polarized to the direction of the z axis. From this it should be appreciated that the largest nonlinear optical material constant $d_{33}$ of the MgO-LiNbO$_3$ is utilized. When the output of the laser diode is 100 mW, and when the interactive length between the waveguide type optical wavelength converter element 20 and the fundamental wave is 10 nm, the output of a resultant second harmonic wave is 12 mW.

The wavelength converter element 20, according to this invention, is provided with periodic domain reversals which extend through the substrate 1 with a thickness of 0.5 mm and, hence, this element may be also used as a bulk crystal type optical wavelength converter element. For instance, this wavelength converter element 20 is replaceable with a KTP crystal for wavelength conversion purposes conventionally disposed within the cavity resonator of a solid-state laser pumped by a laser diode wherein used is a laser crystal such as YAG, YVO$_4$, LNP, or the like, which is oscillated at a wavelength of 1064 nm. Since the effective nonlinear optical material constant of the MgO-LiNbO$_3$ is about 25 pm/V as compared with that of the KTP, that is, 7 pm/V, it is possible to improve the wavelength conversion efficiency of the wavelength converter element to a greater extent.

Because of its type II phase matching, the KTP has a drawback in that the output of the second harmonic wave varies depending on temperatures and the length of the crystal when the polarization of the fundamental wave is changed. Meanwhile, the type I phase matching is effected in the wavelength converter element 20, and this element can overcome such a drawback in the art.

It is possible to fabricate an external resonator type wavelength converter element by grinding, in the shape of a ring resonator, the bulk crystal provided with the periodic domain reversals that are fabricated according to this invention. In this case, any second harmonic wave can be freely obtained in the range of wavelengths beyond ultraviolet frequencies by the arbitrary selection of the period of the domain reversals.

FOURTH EMBODIMENT

Figure 5A:
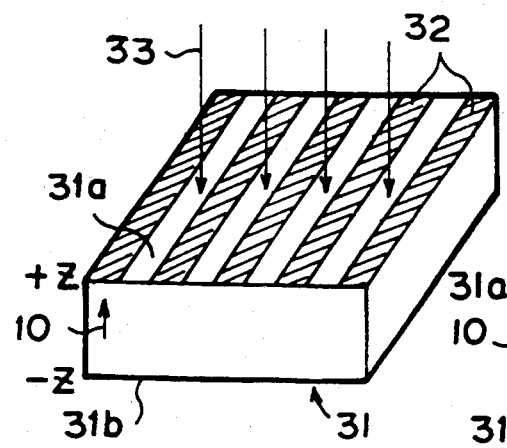
FIGS. 5A to 5D schematically represent the fabrication of periodic domain reversals according to the fabrication method of a fourth embodiment.

A fourth preferred embodiment of this invention will now be described. FIGS. 5A to 5D illustrate the fabrication process of domain reversals according to the fourth embodiment of this invention. In this drawing, the reference numeral 31 designates a LiNbO$_3$ substrate which is made of a ferroelectric possessing the nonlinear optical effect. This LiNbO$_3$ substrate 31 has been preliminarily subjected to a nonpolarizing treatment by means of a known method, and is formed to a thickness of 0.5 mm, as an example. In this embodiment, a "z" plate optically ground at the z surface thereof is used so that the largest nonlinear optical material constant $d_{33}$ can be effectively utilized. As shown in FIG. 5A, a metal mask 32 arrayed at given pitches is deposited over the +z surface 31a of the substrate 31 by a known photolithography technique. This metal mask 32 is made up of Au, for instance, and is formed to a thickness of 1 μm. An arrow 10 in FIGS. 5A to 5D denotes the directions of polarization of the substrate 31.

The entire side surface, coated with the metal mask 32, of the LiNbO$_3$ substrate 31 is then exposed to the radiation of Mg$^{2+}$ ions 33. The acceleration voltage of ions is set to 100 keV, for instance, and the dosage of radiation being set to $1 \times 10^{15}$. This radiation allows Mg$^{2+}$ ions 33 to be implanted into the substrate through uncovered regions. The metal mask 32 is then removed. With this result, an ion implanted region 34, extending in the thicknesswise direction of the substrate, is arrayed alternately with another at intervals Λ of in such a periodic pattern as shown in FIG. 5B. The electric conductivity shows a greater increase at the ion implanted region 34 than the remaining region. Here, the reference numeral 35 designates a region free of implanted ions.

Figure 5C:
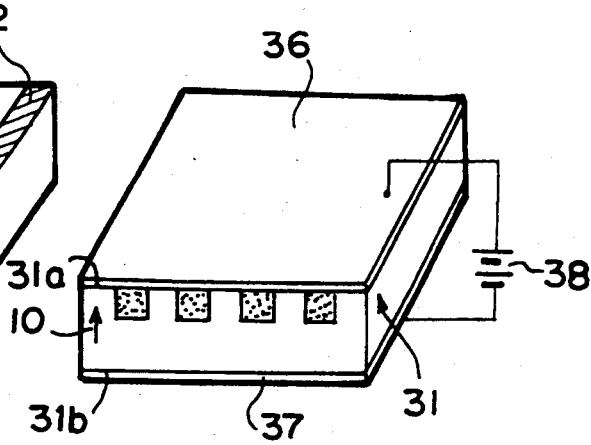
Figure 5B:
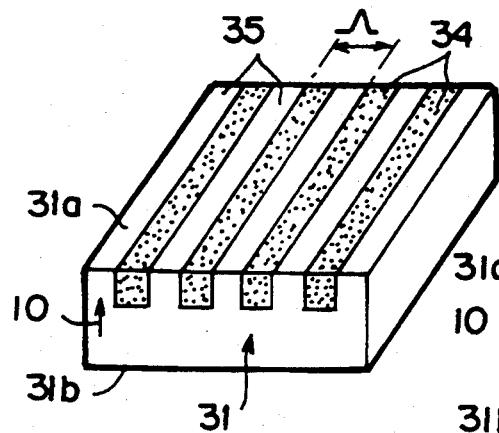
Figure 5D:
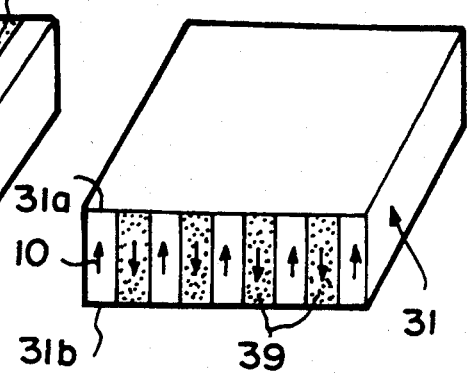

Then, metal electrodes 36 and 37, made of Cr, are positioned on the +z surface 31a and −z surface 31b of the substrate 31, respectively, as shown in FIG. 5C. An electric field is applied from a d.c. power source 38 to the entirety of the substrate 31 via the metal electrodes 36 and 37. At this time, the electric field is set to 1000 V/mm, for instance, and the application time being set to ten minutes. Moreover, the temperature of the substrate 31 is set to 200° C. which is below the Curie point.

The application of an electric field causes the direction of polarization, at the ion implanted region 34 where the electric conductivity rises, to be inverted, but the direction of polarization at the regions 35 where the electric conductivity remains relatively low to be left uninverted. This ion implanted region 34 grows along the orientation of the electric field, and eventually grows deeply enough to extend through the substrate 31. Hence, the ion implanted region 34 and the remaining region 35 are definitely distinguished from each other in the thicknesswise (or depthwise) direction of the substrate 31. With such an arrangement, domain reversals 39 are formed in an alternate pattern at given periods Λ of to extend through the substrate 31 to the rear end thereof under improved control. Here, the period Λ of this alternate pattern is set to be 4 μm with allowances for the wavelength dispersion of the diffractive index of LiNbO$_3$ so that a first-order period can be defined around 880 nm in the direction of the x axis of the substrate 31.

An explanation is given of an optical wavelength converter element formed from the substrate 31 having the periodic domain reversals fabricated in the fourth embodiment. The x surface and the −x surface of the substrate 31 are ground to form optical propagation surfaces 40a and 40b, so that there is obtained a bulk crystal type optical wavelength converter element 40 shown in FIG. 6. This bulk crystal type optical wavelength converter element 40 having the periodic domain reversals is disposed within the cavity resonator of the laserdiode pumped YAG laser shown in the drawing.

This laser diode pumped YAG laser is constituted of a laser diode 44 for emanating, as a pumping beam, a laser beam 43 at a wavelength of 809 nm; a YAG crystal 46 which serves as a laser medium doped with Nd (neodymium), and is located at a position at which the laser beam 43 is converged; and a resonant mirror 47 disposed in front of the YAG crystal 46, that is, rightwards in the drawing. The optical wavelength converter element 40 has a crystal length of 1 mm, and is interposed between the resonant mirror 47 and the YAG crystal 46.

The YAG crystal 46 emanates a laser beam 48 at a wavelength of 946 nm when it is pumped by the laser beam 43 at a wavelength of 809 nm. This solid-state laser beam 48 is oscillated between the end surface 46a, covered with a given coating, of the YAG crystal and a mirror surface 47a of the resonant mirror 47, and then the beam enters the optical wavelength converter element 40, as a result of which the beam is converted to a second harmonic wave 49 at a half wavelength, that is, 473 nm. The solid-state laser beam 48 which serves as the fundamental beam and the second harmonic wave 49 are phasematched (i.e. quasi-phase-matched, or QPM) with each other in the periodic domain reversals, and only this second harmonic wave 49 exits from the resonant mirror 47.

In this embodiment, there is obtained the second harmonic wave 49 with an output substantially as high as 1 mW when the laser diode 44 produces an output of 200 mW. From the fact that such an extremely high wavelength conversion efficiency is obtained, it is proved that the domain reversals 39 are formed throughout in the thicknesswise direction of the substrate 31 under improved control.

In the above embodiment, although the ion implantation is employed to decrease the electric conductivity of the ferroelectric, ions or atoms may be implanted into the ferroelectric in order to increase the electric conductivity of the implanted region. Moreover, instead of $Mg^{2+}$ ions used in the above embodiment, $H^+$ ions, or the like, may be implanted.

The fabrication technique of this embodiment is used to prepare the bulk type optical wavelength converter element, but may be used for the preparation of an optical waveguide type optical wavelength converter element.

This fabrication method is also applicable to the fabrication of domain reversals on ferroelectrics, other than $LiNbO_3$ used in the above embodiment, such as $LiTaO_3$, $KNbO_3$, KTP, or equivalents.

The implantation of ions or atoms is carried out using the metal mask 32 as mentioned in the above embodiment, but may be performed like a beam scanning using FIB (focusing ion beam) apparatus. However, in terms of working efficiency, the use of the metal mask as employed in the embodiment can be said to be much preferable, because it allows ions or atoms to be implanted in little time.

In order to apply an electrical field to the entire substrate 31, the corona electrical charging technique used in the first embodiment may be employed as an alternative in place of the direct application of an electric field to the substrate 31 via the metal electrodes 36 and 37.

FIFTH EMBODIMENT

Figure 7A:
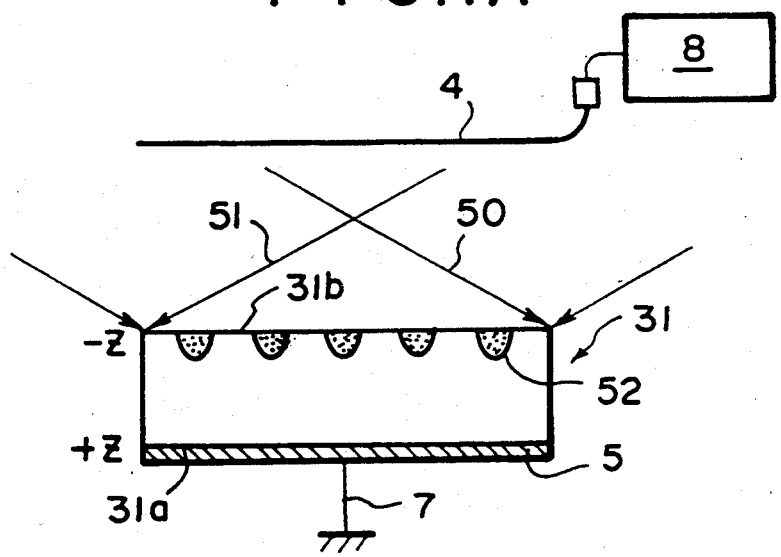
FIGS. 7A and 7B schematically represent the fabrication of periodic domain reversals according to the fabrication method of a fifth embodiment.
Figure 7B:
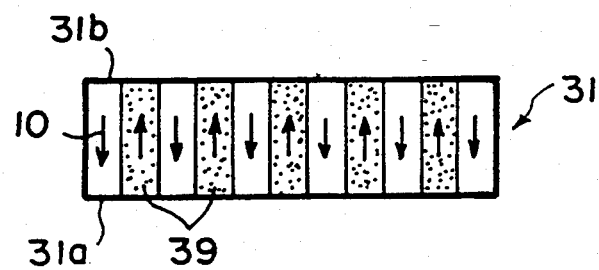

A fifth embodiment will be described hereunder. FIGS. 7A and 7B illustrate the fabrication of domain reversals in accordance with the fifth embodiment. In the drawing, the reference numerals 4, 5, 7 and 8 designate a corona wire, a metal Pt electrode, the earth and a power source, respectively, and these elements are analogous to those used in the first embodiment. The reference numeral 31 designates a $LiNbO_3$ substrate having a thickness of 0.5 mm similar to that used in the fourth embodiment. As can be seen from FIG. 7A, laser beams 50 and 51 at a wavelength of 325 nm are emanated from a non-illustrated He—Cd laser to the optically ground −z surface 31b of the $LiNbO_3$ substrate 31, and there is produced an interference pattern recurring at given periods $\Lambda=4$ $\mu$m in accordance with the two-beam interference law.

With such an interference pattern, the photo refractive effect appears only at the region of the $LiNbO_3$ substrate 31 where the intensity of a laser beam is increased by the interference, and hence the electric conductivity of this region is increased. When an electric field is applied to the $LiNbO_3$ substrate 31 while remaining in the above state by the corona electrical charging in the same manner as the first embodiment, the polarization of only the region 52 where the photo refractive effect appears is selectively inverted, so that this region turns into a domain reversal. This domain reversal grows along the orientation of the electric field, and eventually grows deeply enough to extend through the substrate 31. Thus, the domain reversals and the remaining region are definitely distinguished from each other in the depthwise (thicknesswise) direction of the substrate 31. The domain reversal 39, extending through the substrate to the rear end thereof as shown in FIG. 7B, are formed in an alternate pattern recurring at given periods $\Lambda$ under improved control.

In this case, an electric field may be directly applied to the substrate 31 using a pair of electrodes as shown in FIG. 5C instead of the application of an electric field to the $LiNbO_3$ substrate 31 by the corona electrical charging. In that event, a transparent electrode can be used for the −z surface 31b of the substrate 31.

A bulk crystal type optical wavelength converter element is formed from the $LiNbO_3$ substrate 31 having the periodic domain reversals fabricated in the manner as mentioned above. This optical wavelength converter element is then disposed and used within the cavity resonator of a laser diode pumped YAG laser similar to that shown in FIG. 6. Even in that case, there is obtained the second harmonic wave 49 with an output substantially as high as 1 mW when the laser diode 44 produces an output of 200 mW. Thus, it is proved that the domain reversals 39 are formed throughout in the thicknesswise direction of the substrate 31 under improved control.

SIXTH EMBODIMENT

Figure 8A:
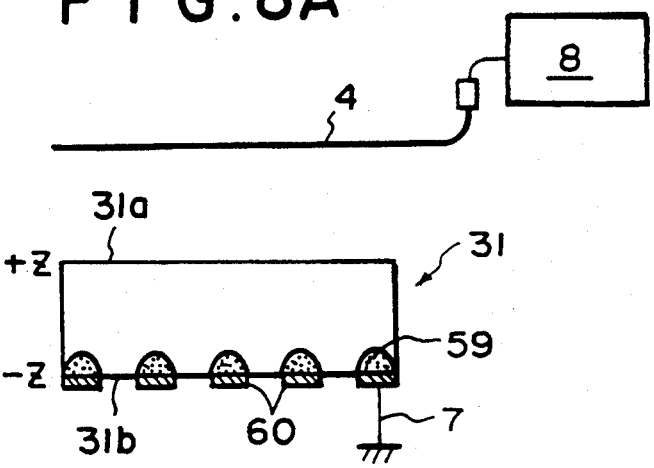
FIGS. 8A and 8B schematically represent the fabrication of periodic domain reversals according to the fabrication method of a sixth embodiment.
Figure 8B:
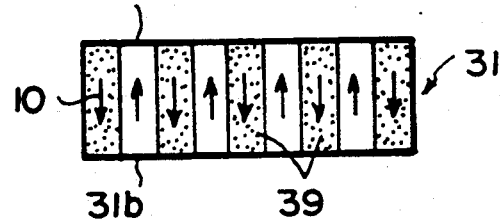

A sixth preferred embodiment of this invention will now be described. FIGS. 8A and 8B illustrate the fabrication of domain reversals in accordance with the sixth embodiment. In the drawing, the reference numerals 4, 7 and 8 designate a corona wire, the earth and a power source, respectively, and these elements are analogous to those used in the first embodiment. The reference numeral 31 designates a LiNbO$_3$ substrate having a thickness of 0.5 mm similar to that used in the fourth embodiment. An alternate electrode 60, recurring at given pitches of $\Lambda=4$ μm, is deposited on the optically ground $-z$ surface 31$b$ of the LinbO$_3$ substrate 31 by a known photolithography technique.

In the same manner as the first embodiment, an electric field is applied to the LiNbO$_3$ substrate 31 by the corona electrical charging, the polarization of only the region 59 of the substrate 31 occupied by the alternate electrode 60 is selectively inverted, and this region turns into a domain reversal. This domain reversal grows along the orientation of the electric field, and eventually grows deeply enough to extend through the substrate 31. Thus, the domain reversals and the remaining region are definitely distinguished from each other in the depthwise (thicknesswise) direction of the substrate 31. In this embodiment, a voltage of 5 kV is applied to the substrate for five minutes, and the temperature of the substrate 31 is maintained at 50° C. during the application of the electric field.

The substrate 31 is subjected to a selective etching using an etchant which is a mixture of HF (hydrofluoric acid) and HNO$_3$ after it has been separated along the y surface thereof, and ground. When this substrate 31 is observed in cross section (from the y surface thereof), it turns out that the periodic domain reversals 39 are formed at periods of $\Lambda=4$ μm at the place occupied by the alternate electrode 60, and extend through the substrate from the $-z$ surface to the $+z$ surface under improved control as shown in FIG. 8B.

Figure 6:
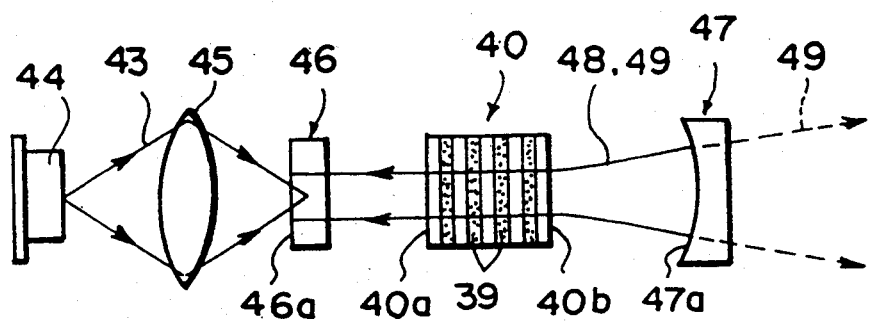
FIG. 6 is a side elevation view showing a solid-state laser incorporating an optical wavelength converter element with domain reversals which are fabricated in accordance with the present invention.

As mentioned above, the bulk crystal type optical wavelength converter element is formed from the LiNbO$_3$ substrate 31 having the periodic domain reversals, and this element is disposed and used within the cavity resonator of a laser diode pumped YAG laser analogous to that shown in FIG. 6. Even in this case, there is obtained the second harmonic wave 49 with an output substantially as high as 1 mW when the laser diode 44 produces an output of 200 mW. Thus, it is proved that the domain reversals 39 are formed throughout in the thicknesswise direction of the substrate 31 under improved control.

SEVENTH EMBODIMENT

Figure 9A:
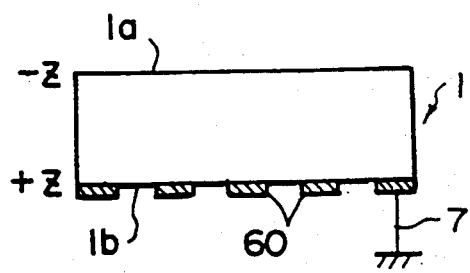
FIGS. 9A and 9B schematically represent the fabrication of periodic domain reversals according to the fabrication method of a seventh embodiment.
Figure 9B:
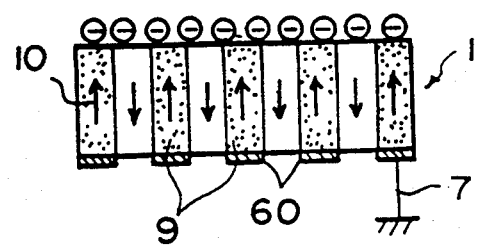

A seventh preferred embodiment of this invention will now be described. FIGS. 9A and 9B illustrate the fabrication of a domain reversals in accordance with the seventh embodiment of this invention. In this drawing, the reference numeral 1 designates a MgO—LiNbO$_3$ substrate having a thickness of 0.5 mm similar to that used in the first embodiment. The alternate electrode 60 recurring at given periods of $\Lambda=4$ μm is deposited on the optically ground $+z$ surface 1$b$ of this MgO—LiNbO$_3$ substrate 1 by a known photolithography as shown in FIG. 9A.

Figure 10:
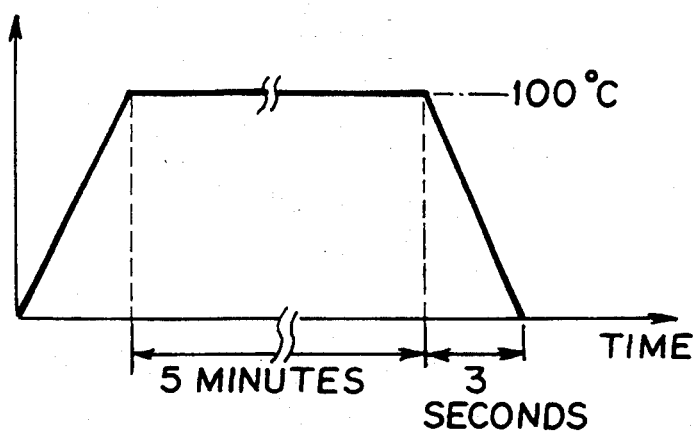
FIG. 10 is a graph showing a temperature program for use in a heat treatment according to the seventh embodiment.

The MgO-LiNbO$_3$ substrate 1, with the alternate electrode 60 grounded to the earth 7, is subjected to a heat treatment in accordance with a temperature program shown in FIG. 10. In practice, the substrate 1 is heated up to 100° C., and then rapidly cooled down. With the result, by virtue of the pyroelectric effect, electric charges develop over the uncovered surface of the substrate as shown in FIG. 9B. The substrate 1 is applied with an electric charge by means of these surface electric charges. In this embodiment, the surface electric charge on the $-z$ surface 1$a$ of the substrate 1 is 3.5 kV, and the electric charge applied between the $-z$ surface 1$a$ and $+z$ surface 1$b$ is 70 kV/cm.

The application of the electric charge to the substrate 1 causes the polarization of only the region occupied by the alternate electrode 60 of the substrate 1 to be selectively inverted, and this region turns into a domain reversal. This domain reversal grows along the orientation of the electric field, and eventually grows deeply enough to extend through the substrate 1. Thus, the domain reversals and the remaining region are definitely distinguished from each other in the depthwise (thicknesswise) direction of the substrate 1.

As with the sixth embodiment, when this substrate 1 is observed in cross section (from the y surface thereof), it turns out that the periodic domain reversals 9 are formed, at periods of $\Lambda=4$ μm at the place occupied by the alternate electrode 60, to extend through the substrate from the $-z$ surface to the $+z$ surface under improved control as shown in FIG. 9B.

As mentioned above, the bulk crystal type optical wavelength converter element is formed from the MgO—LiNbO$_3$ substrate 1 having the periodic domain reversals, and this element is disposed and used within the cavity resonator of a laser diode pumped YAG laser similar to that shown in FIG. 6. Even in that case, there is obtained the second harmonic wave 49 with an output substantially as high as 1 mW when the laser diode 44 produces an output of 200 mW. Thus, it is proved that the domain reversals 9 are formed throughout in the thicknesswise direction of the substrate 31 under improved control.

EIGHTH EMBODIMENT

Figure 11:
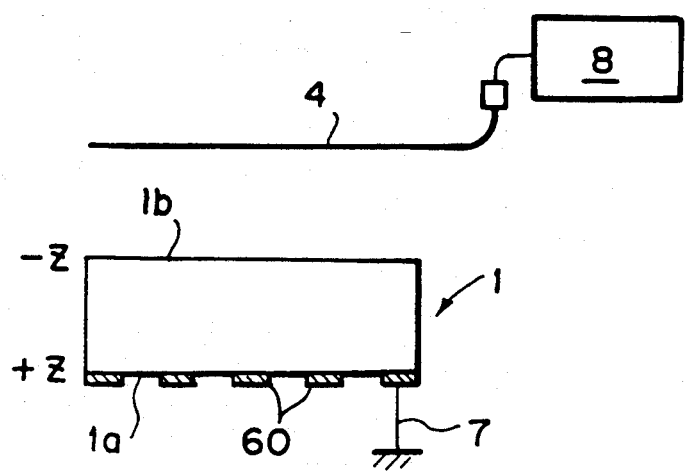
FIG. 11 is a schematic representation showing the fabrication of periodic domain reversals according to the fabrication method of an eighth embodiment.

An eighth embodiment of this invention will now be described. FIG. 11 illustrates the fabrication of domain reversals according to the eighth embodiment of this invention. In this drawing, the reference numeral 1 and 60 designate a MgO-LiNbO$_3$ substrate and an alternate electrode, respectively, and these are analogous to the corresponding features used in the seventh embodiment. This substrate 1 is subjected to a heat treatment in accordance with a temperature program similar to that used in the seventh embodiment, and undergoes the application of an electric field arising from the pyroelectric effect.

In this embodiment, when the substrate 1 is rapidly cooled down from 100° C., an electric field is additionally applied to the substrate 1 by the corona electric charging technique using the corona wire 4 and the power source 8. With this additional application of the electric charge, it becomes possible to apply an electric field larger than is applied by virtue of only the pyroelectric effect, and hence the periodic domain reversals 9 can be fabricated under much better control.

The application technique of the electric field utilizing the pyroelectric effect set forth above may be applied to the embodiments from first through sixth instead of each electric field application technique employed therein.

It goes without saying that the techniques employed in the embodiments fifth through eighth can be used for the fabrication of the optical waveguide type optical wavelength converter element.

NINTH EMBODIMENT

A ninth embodiment will now be described. FIGS. 12A to 12D illustrate the fabrication of domain reversals in accordance with the ninth embodiment of this invention. In the drawing, the reference numeral 1 designates a MgO—LiNbO3 substrate which is made of a ferroelectric possessing the nonlinear optical effect. This substrate 1 is subjected to a unipolarizing treatment, and is formed to a thickness of 0.5 mm. This substrate is also optically ground on the z surfaces thereof so that the largest nonlinear optical material constant $d_{33}$ can be effectively utilized. A Ta thin film is deposited on the −z surface 1a of the substrate 1 by sputtering a metal Ta, and a Ta mask 2 is formed in an alternate pattern shown in FIG. 12A by the photolithography and dry etching. The period of this alternate pattern is set to be 4 μm with allowances for the wavelength dispersion of the diffractive index of MgO—LiNbO3 so that a first-order period can be defined around 880 nm in the direction of the x axis of the substrate 1.

Figure 12A:
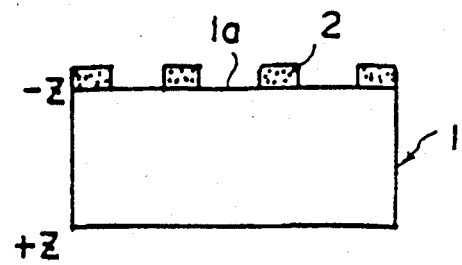
FIGS. 12A to 12D schematically represent the fabrication of periodic domain reversals according to the fabrication method of a ninth embodiment.
Figure 12B:
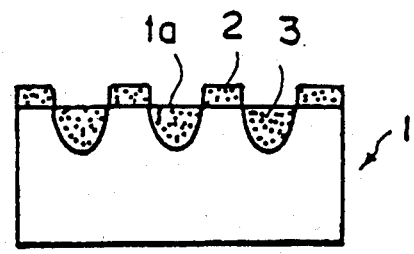

The substrate 1 then undergoes a proton exchange treatment in pyrophosphate for 15 minutes at a temperature of 230° C., thereby preparing a periodic proton exchanged region 3 at a thickness of 0.5 μm as shown in FIG. 12B. After the proton exchange treatment, the Ta mask 2 is removed by an etchant which is a mixture of NaOH and $H_2O_2$.

Figure 12C:
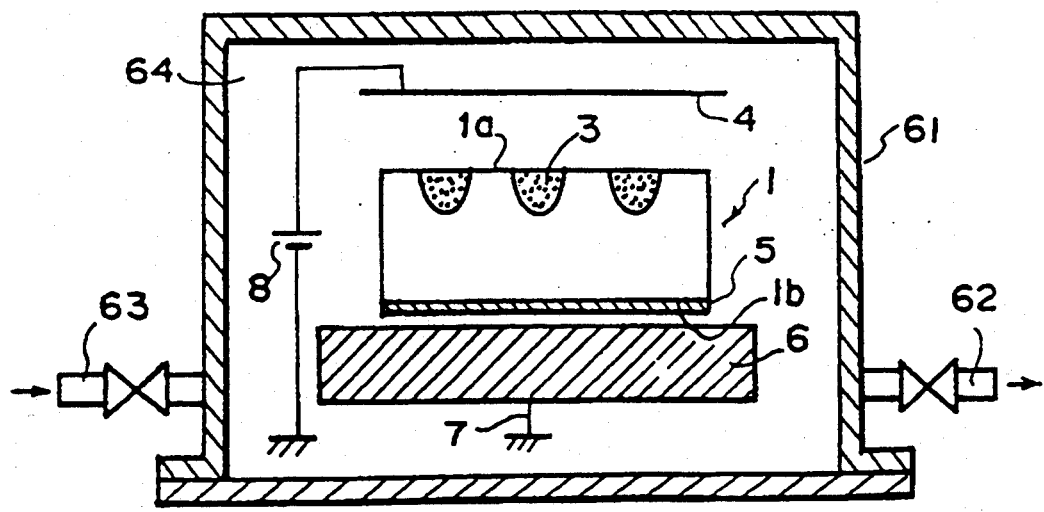

In order to obtain an even electric potential during the application of an electric field, which will be discussed later, the metal Pt 5 is deposited on the +z surface at the rear end of the substrate by the electron beam evaporation. The sample thus prepared is then heated up to a temperature of 200° C. by means of the heater 6 which is connected to the earth 7 as shown in FIG. 12C. The sample is also applied with an electric field by the corona electrical charging. During this time, the substrate 1 and the electric field application means are positioned inside a hermetic enclosure 61, the air inside this hermetic enclosure 61 is replaced with the dry $N_2$ (nitrogen) gas 64 with humidity suppressed to 30% or less through a drawn path 62 and a supply path 63, each having a valve. An electric field is then applied to the substrate 1 in the atmosphere of $N_2$ gas 64. The corona wire 4 is located away from the substrate 1 at an interval of 10 mm, and a voltage of −5 kV is applied for ten minutes from the high voltage power source 8 to the substrate 1 via the corona wire 4.

After the above treatments, the metal Pt 5 is removed from the +z surface 1b, and the substrate 1 is sliced along the y surface thereof and ground. Thereafter, the substrate is subjected to a selective etching using an etchant which is a mixture of HF and $HNO_3$ at a ratio of 1:2.

Figure 12D:
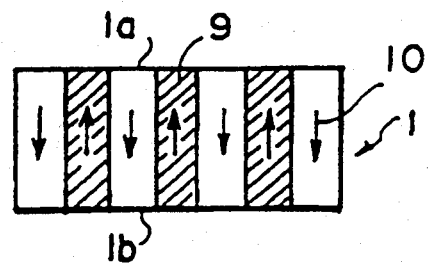

When the substrate 1 is observed in cross section (from the y surface thereof), it turns out that periodic domain reversals 9 are formed in the proton-exchanged region 3, wherein the periodic domain reversals 9 extend through the substrate from the −z surface to the +z surface, and are spaced at periods of $\Lambda=4$ μm as shown in FIG. 12D.

When a channel waveguide is formed after the preparation of the periodic domain reversals, the substrate is annealed at, for example, a temperature of 400° C. for four hours in order to prevent variations in the refractive index of the proton-exchanged region from affecting propagation losses in the waveguide by averaging the diffractive index.

TENTH EMBODIMENT

Figure 13:
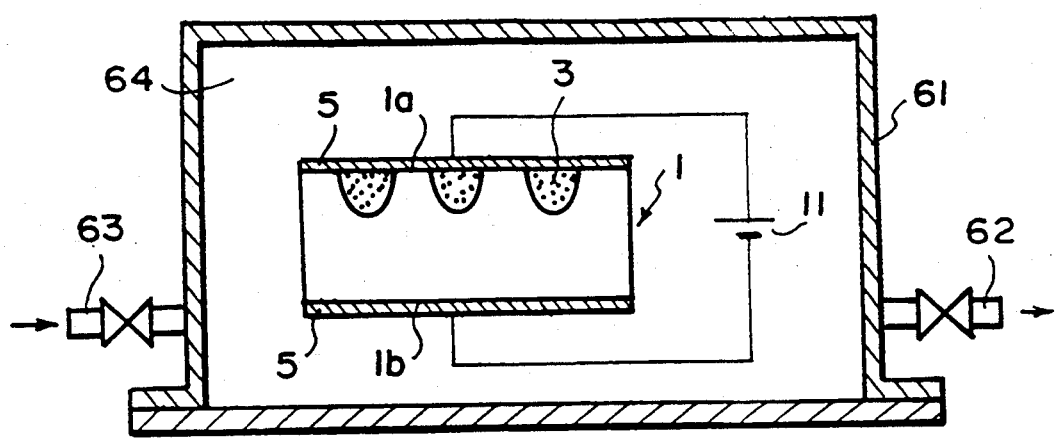
FIG. 13 is a schematic representation showing the fabrication of periodic domain reversals according to the fabrication method of a tenth embodiment.

With reference to FIG. 13, a tenth embodiment will be described. This tenth embodiment is different from the ninth embodiment in the application technique of the electric field. In short, the periodic proton-exchanged region 3 is formed on the MgO—LiNbO3 substrate 1 in the same way as in the ninth embodiment, and then the metal Pt 5 is deposited, as an electrode, on both the −z surface 1a and the +z surface of the substrate 1. A d.c. voltage or a pulse voltage is then applied from the power source 11 to the substrate 1 via the electrodes.

Even at this time, the substrate 1 is applied with an electric field inside the hermetic enclosure 61 in dry $N_2$ (nitrogen) gas 64 with the humidity suppressed to 30% or less. Thereby, as with the ninth embodiment, there are obtained the periodic domain reversals 9 with even pitch and depth.

When the electric field is applied to the ferroelectric utilizing the corona electrical charging technique as it was practiced in the ninth embodiment, it is impossible to practice the application of the electric field in vacuum. However, as with the tenth embodiment or an eleventh embodiment, which will be described later, when an electric field is applied to the substrate via electrodes which are directly positioned on the substrate, the application of the electric field can be carried out not only in dry atmosphere, but also in vacuum.

ELEVENTH EMBODIMENT

Figure 14A:
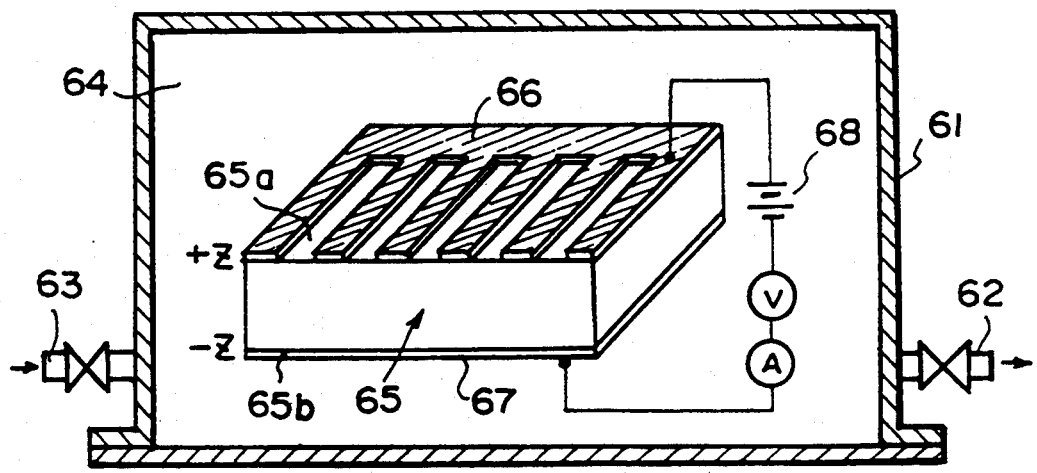
FIGS. 14A and 14B schematically represent the fabrication of periodic domain reversals according to the fabrication method of an eleventh embodiment.
Figure 14B:
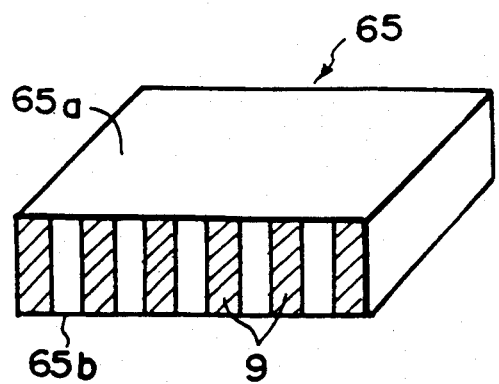

With reference to FIGS. 14A and 14B, an eleventh embodiment will be described hereinbelow. In this drawing, the reference numeral 65 designates a LiTaO3 substrate which is made of a ferroelectric possessing the nonlinear optical effect. This substrate 65 is subjected to a unipolarizing treatment, and is formed to a thickness of 0.5 mm. This substrate is also optically ground on the z surfaces thereof so that the largest nonlinear optical material constant $d_{33}$ can be effectively utilized. After a metal Pt is deposited on the +z surface 65a of the substrate 65, a desired periodic pattern is formed by means of the photolithography and dry etching, and then a metal Pt electrode (alternate electrode) 66 is formed as shown in FIG. 14A. A metal Pt is also deposited on the −z surface 65b of the substrate 65, so that there is obtained an earth electrode 67 consisting of a metal Pt coated on the entire −z surface 65b.

This substrate 65 is then positioned within the hermetic enclosure 61, and is heated (e.g. in the range between room temperature and 300° C.) in the dry $N_2$ gas 64 with the humidity suppressed to 30% or less. A d.c. voltage is applied by means of a d.c. power source 68 so that an electric field, in the range of several tens V/mm to several tens of hundreds V/mm, is produced on the +z surface side. Thereby, in this instance, it turns out that there are also formed in the region sandwiched between the electrode 66 and the electrode 67 the periodic domain reversals 9 with even pitch and depth.

For comparison purposes, periodic domain reversals are formed on the LiTaO3 substrate 65 in the same manner as the eleventh embodiment with the exception that an electric field is applied to the substrate in the atmosphere with a humidity of 70%. It turns out that the periodic domain reversals are formed, but they have uneven depth and pitch (width). This seems to be ascribed to the fact that the surface resistance is deteriorated by humidity in the atmosphere, and that a resultant uneven resistance inside the surface causes a leakage current to be increased.

Figure 15:
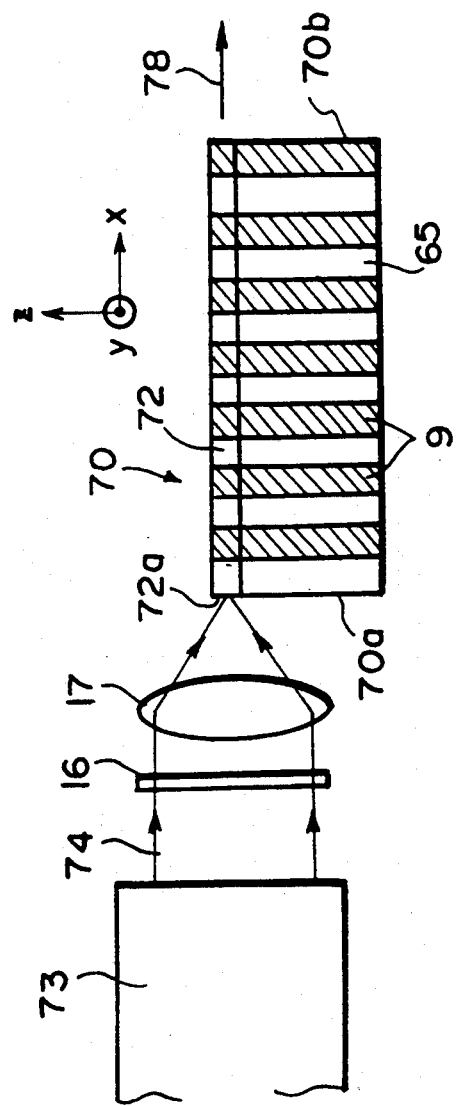
FIG. 15 is a schematic representation showing the wavelength converter element fabricated in the eleventh embodiment, when it is in use.

An explanation will be given of a waveguide type optical wavelength converter element using the first-order domain reversals fabricated in the eleventh embodiment. FIG. 15 schematically illustrates the structure of this waveguide type wavelength converter element 70. After the fabrication of the periodic domain reversals 9 on the substrate 65 in the same manner as in the eleventh embodiment, a proton-exchanged channel waveguide 72 is so formed that light will propagate along the x axis of the substrate. The entry end 70a and the exit end 70b of this optical wavelength converter element 70 are edge-ground. At this time, the humidity of the dry $N_2$ gas 64 is set, particularly, to less than 10% during the application of the electric field, and the period $\Lambda$ of the periodic domain reversals 9 is set to 4 $\mu$m.

When a laser beam at a wavelength of $\lambda$ is introduced, as a fundamental wave, into the entry end 70a, a phase matching in the waveguide-waveguide mode is effected, and a second harmonic wave at a wavelength of $\lambda/2$ exits from the output end 70b efficiently.

As one example, a waveguide type optical wavelength converter element, which uses a Ti:$Al_2O_3$ laser as a fundamental wave light source, will be described. A laser beam 74, emanated from the laser diode 13 as the fundamental wave, is polarized and aligned to the z axis of the substrate 65 by the $\lambda/2$ plate 16. This polarized wave is then collected by the condensing lens 17, and converged to the end surface 72a of the channel waveguide 72. Thus, the fundamental wave 74 enters and propagates through the channel waveguide 72.

The fundamental wave 74, which travels through the channel in the waveguide mode, is phase-matched in the periodic domain reversals in the waveguide 72, as a result of which the fundamental wave is converted to a second harmonic wave 78. This second harmonic wave 78 also propagates through the channel waveguide 72 in the waveguide mode, and efficiently exits from the output end 70b. When the output of the laser diode is 40 mW, and when the interactive length between the waveguide type optical wavelength converter element 70 and the fundamental wave is 5 nm, the output of a resultant second harmonic wave is 3 mW.

In the meantime, in the case of the waveguide type optical wavelength converter element having the periodic domain reversals fabricated for comparison purposes, there is obtained a second harmonic wave with an output of 0.3 mW when the output from the laser 73 is 40 mW, and the interactive length between the waveguide type optical wavelength converter element and the fundamental wave is 5 mm. As is evident from the above, according to this invention, it turned out that there is obtained a second harmonic wave with an output which is one order higher than that produced from the optical wavelength converter element fabricated by the existing technique.

The fabrication techniques described in connection with the embodiments from ninth to eleventh are not restricted to where the foregoing MgO—LiNbO$_3$ or the LiTaO$_3$ are used as a ferroelectric material, but can be applied to the case where a LiNbO$_3$ or equivalents is used as a ferroelectric material.

TWELFTH EMBODIMENT

A twelfth embodiment will now be described. As with the first embodiment, the periodic domain reversals 9 are formed on the MgO—LiNbO$_3$ substrate 1 shown in FIGS. 1A to 1D. Here, the period of the domain reversals are set to be 4.6 $\mu$m so that a first-order period can be defined around 946 nm of the YAG. This substrate 1 is then subjected to a heat treatment in the air at a temperature of 600° C. which is below the Curie point (1210° C.) of MgO—LiNbO$_3$ for three hours. Thus, when the temperature of the heat treatment is below the Curie point, the direction of polarization, oriented to a predetermined direction resulting from the application of the electric field, is not varied by the heat treatment.

Before and after the above mentioned heat treatment, the substrate 1 is observed from the ground x surface by means of a polarizing microscope. Beneath the microscope, light is extinguished, and the entire view of the microscope becomes dark at the quenching point. When the substrate 1 is observed before the heat treatment, only the proton-exchanged region 3 (see FIGS. 1A to 1D) remains unquenched at the quenching point, and it is admittedly observed that the diffractive index is evidently varied by the application of the electric field. Meanwhile, when the substrate 1 is observed after the heat treatment, the entire view turns to dark, and it is admittedly observed that the diffractive index is averaged without local variations in the diffractive index of the proton-exchanged region 3. Thus, the effect of the heat treatment can be confirmed by the observation using the polarizing microscope.

A bulk crystal type optical wavelength converter element having a crystal length of 1 mm is formed from the substrate 1 having the periodic domain reversals fabricated in accordance with the technique of the twelfth embodiment. This converter element is disposed within the cavity resonator of a laser diode pumped YAG laser as shown in FIG. 6. At this time, there is obtained the second harmonic wave 49 with an output of 10 mW when the laser diode 44 produces an output of 200 mW. This second harmonic wave 49 has a fine profile free of scattered or stray light. To the contrary, the output of a second harmonic wave is measured when the optical wavelength converter element is disposed inside the cavity resonator of the laser diode pumped YAG laser 44, wherein the element is fabricated in the same manner as mentioned above but without the foregoing heat treatment. The output of the resultant second harmonic wave is 1 mW when the laser diode 44 produces an output of 200 mW. As stated above, when the optical wavelength converter element is positioned inside the cavity resonator of the solid-state laser, it turns out that an internal loss of the cavity resonator is reduced because of the foregoing heat treatment, and hence the wavelength conversion efficiency is improved.

THIRTEENTH EMBODIMENT

A thirteenth embodiment will now be described. As with the second embodiment, the periodic domain reversals 9 are formed on the MgO—LiNbO$_3$ substrate 1. This substrate 1 is then subjected to a heat treatment in the same manner as the twelfth embodiment.

A bulk crystal type optical wavelength converter element having a crystal length of 1 mm is formed from the substrate 1 having the periodic domain reversals fabricated in accordance with the technique of the thirteenth embodiment. This converter element is disposed within the cavity resonator of a laser diode pumped YAG laser as shown in FIG. 6. At this time, there is obtained the second harmonic wave 49 with an output of 10 mW when the laser diode 44 produces an output of 200 mW. To the contrary, the output of a second harmonic wave is measured when the optical wavelength converter element is disposed inside the cavity resonator of the laser diode pumped YAG laser 44, wherein the element is fabricated in the same manner as mentioned above, but without the foregoing heat treatment. Then, the output of the resultant second harmonic wave is 1 mW when the laser diode 44 produces an output of 200 mW.

FOURTEENTH EMBODIMENT

A fourteenth embodiment will now be described. As with the third embodiment, the periodic domain reversals 9 are formed on the MgO—LiNbO$_3$ substrate 1. This substrate 1 is then subjected to a heat treatment in the same manner as the twelfth embodiment.

A bulk crystal type optical wavelength converter element having a crystal length of 1 mm is formed from the substrate 1 having the periodic domain reversals fabricated in accordance with the technique of the fourteenth embodiment. This converter element is disposed within the cavity resonator of a laser diode pumped YAG laser as shown in FIG. 6. At this time, there is obtained the second harmonic wave 49 with an output of 10 mW when the laser diode 44 produces an output of 200 mW. To the contrary, the output of a second harmonic wave is measured when the optical wavelength converter element is disposed inside the cavity resonator of the laser diode pumped YAG laser 44, wherein the element is fabricated in the same manner as mentioned above, but without the foregoing heat treatment. Then, the output of the resultant second harmonic wave is 1 mW when the laser diode 44 produces an output of 200 mW.

FIFTEENTH EMBODIMENT

A fifteenth embodiment will now be described. As with the fourth embodiment, the periodic domain reversals 39 are formed on the LiNbO$_3$ substrate 31 shown in FIGS. 5A to 5D. This substrate 31 is then subjected to a heat treatment in the air at a temperature of 600° C., which is below the Curie point (1130° C.) of LiNbO$_3$, for three hours.

A bulk crystal type optical wavelength converter element having a crystal length of 1 mm is formed from the substrate 31 having the periodic domain reversals fabricated in accordance with the technique of the fifteenth embodiment. This converter element is disposed within the cavity resonator of a laser diode pumped YAG laser as shown in FIG. 6. At this time, there is obtained the second harmonic wave 49 with an output of 10 mW when the laser diode 44 produces an output of 200 mW. To the contrary, the output of a second harmonic wave is measured when the optical wavelength converter element is disposed inside the cavity resonator of the laser diode pumped YAG laser 44, wherein the element is fabricated in the same manner as mentioned above, but without the foregoing heat treatment. The output of the resultant second harmonic wave is 1 mW when the laser diode 44 produces an output of 200 mW.

SIXTEENTH EMBODIMENT

A sixteenth embodiment will now be described. As with the fifth embodiment, the periodic domain reversals 39 are formed on the LiNbO$_3$ substrate 31 shown in FIGS. 5A to 5D. Likewise to the fifteenth embodiment, this substrate 31 is then subjected to a heat treatment.

A bulk crystal type optical wavelength converter element having a crystal length of 1 mm is formed from the substrate 31 having the periodic domain reversals fabricated in accordance with the technique of the sixteenth embodiment. This converter element is disposed within the cavity resonator of a laser diode pumped YAG laser as shown in FIG. 6. At this time, there is obtained the second harmonic wave 49 with an output of 10 mW when the laser diode 44 produces an output of 200 mW. To the contrary, the output of a second harmonic wave is measured when the optical wavelength converter element is disposed inside the cavity resonator of the laser diode pumped YAG laser 44, wherein the element is fabricated in the same manner as mentioned above, but without the foregoing heat treatment. The output of the resultant second harmonic wave is 1 mW when the laser diode 44 produces an output of 200 mW.

SEVENTEENTH EMBODIMENT

A seventeenth embodiment will now be described. As with the sixth embodiment, the periodic domain reversals 39 are formed on the LiNbO$_3$ substrate 31 shown in FIGS. 5A to 5D. Likewise to the fifteenth embodiment, this substrate 31 is then subjected to a heat treatment.

A bulk crystal type optical wavelength converter element having a crystal length of 1 mm is formed from the substrate 31 having the periodic domain reversals fabricated in accordance with the technique of the seventeenth embodiment. This converter element is disposed within the cavity resonator of a laser diode pumped YAG laser as shown in FIG. 6. At this time, there is obtained the second harmonic wave 49 with an output of 10 mW when the laser diode 44 produces an output of 200 mW. To the contrary, the output of a second harmonic wave is measured when the optical wavelength converter element is disposed inside the cavity resonator of the laser diode pumped YAG laser 44, wherein the element is fabricated in the same manner as mentioned above, but without the foregoing heat treatment. The output of the resultant second harmonic wave is 1 mW when the laser diode 44 produces an output of 200 mW.

EIGHTEENTH EMBODIMENT

An eighteenth embodiment will now be described. As with the seventh embodiment, the periodic domain reversals 9 are formed on the MgO—LiNbO$_3$ substrate 1 shown in FIGS. 1A to 1D. This substrate 1 is then subjected to a heat treatment in the air at a temperature of 600° C., which is below the Curie point (1210° C.) of MgO—LiNbO$_3$, for three hours.

A bulk crystal type optical wavelength converter element having a crystal length of 1 mm is formed from the substrate 1 having the periodic domain reversals fabricated in accordance with the technique of the eighteenth embodiment. This converter element is disposed within the cavity resonator of a laser diode pumped YAG laser as shown in FIG. 6. At this time, there is obtained the second harmonic wave 49 with an output of 10 mW when the laser diode 44 produces an output of 200 mW. To the contrary, the output of a second harmonic wave is measured when the optical wavelength converter element is disposed inside the cavity resonator of the laser diode pumped YAG laser 44, wherein the element is fabricated in the same manner as mentioned above, but without the foregoing heat treatment. The output of the resultant second harmonic wave is 1 mW when the laser diode 44 produces an output of 200 mW.

NINETEENTH EMBODIMENT

A nineteenth embodiment will now be described. As with the eighth embodiment, the periodic domain reversals 9 are formed on the MgO—LiNbO$_3$ substrate 1 shown in FIGS. 1A to 1D. Likewise to the eighteenth embodiment, this substrate 1 is then subjected to a heat treatment.

A bulk crystal type optical wavelength converter element having a crystal length of 1 mm is formed from the substrate 1 having the periodic domain reversals fabricated in accordance with the technique of the nineteenth embodiment. This converter element is disposed within the cavity resonator of a laser diode pumped YAG laser as shown in FIG. 6. At this time, there is obtained the second harmonic wave 49 with an output of 10 mW when the laser diode 44 produces an output of 200 mW. To the contrary, the output of a second harmonic wave is measured when the optical wavelength converter element is disposed inside the cavity resonator of the laser diode pumped YAG laser 44, wherein the element is fabricated in the same manner as mentioned above, but without the foregoing heat treatment. The output of the resultant second harmonic wave is 1 mW when the laser diode 44 produces an output of 200 mW.

TWENTIETH EMBODIMENT

A twentieth embodiment will now be described. As with the ninth embodiment, the periodic domain reversals 9 are formed on the MgO—LiNbO$_3$ substrate 1 shown in FIGS. 1A to 1D. Likewise to the eighteenth embodiment, this substrate 1 is then subjected to a heat treatment.

A bulk crystal type optical wavelength converter element having a crystal length of 1 mm is formed from the substrate 1 having the periodic domain reversals fabricated in accordance with the technique of the twentieth embodiment. This converter element is disposed within the cavity resonator of a laser diode pumped YAG laser as shown in FIG. 6. At this time, there is obtained the second harmonic wave 49 with an output of 10 mW when the laser diode 44 produces an output of 200 mW. To the contrary, the output of a second harmonic wave is measured when the optical wavelength converter element is disposed inside the cavity resonator of the laser diode pumped YAG laser 44, wherein the element is fabricated in the same manner as mentioned above but without the foregoing heat treatment. The output of the resultant second harmonic wave is 1 mW when the laser diode 44 produces an output of 200 mW.

TWENTY-FIRST EMBODIMENT

A twenty first embodiment will now be described. As with the tenth embodiment, the periodic domain reversals 9 are formed on the MgO—LiNbO$_3$ substrate 1 shown in FIGS. 1A to 1D. Likewise to the eighteenth embodiment, this substrate 1 is then subjected to a heat treatment.

A bulk crystal type optical wavelength converter element having a crystal length of 1 mm is formed from the substrate 1 having the periodic domain reversals fabricated in accordance with the technique of the twenty-first embodiment. This converter element is disposed within the cavity resonator of a laser diode pumped YAG laser as shown in FIG. 6. At this time, there is obtained the second harmonic wave 49 with an output of 10 mW when the laser diode 44 produces an output of 200 mW. To the contrary, the output of a second harmonic wave is measured when the optical wavelength converter element is disposed inside the cavity resonator of the laser diode pumped YAG laser 44, wherein the element is fabricated in the same manner as mentioned above, but without the foregoing heat treatment. The output of the resultant second harmonic wave is 1 mW when the laser diode 44 produces an output of 200 mW.

TWENTY-SECOND EMBODIMENT

A twenty second embodiment will now be described. As with the eleventh embodiment, the periodic domain reversals 9 are formed on the LiTaO$_3$ substrate 65 shown in FIGS. 14A and 14B. This substrate 65 is then subjected to a heat treatment in the air at a temperature of 560° C., which is below the Curie point (610° C.) of LiTaO$_3$, for three hours.

A bulk crystal type optical wavelength converter element having a crystal length of 1 mm is formed from the substrate 1 having the periodic domain reversals fabricated in accordance with the technique of the twenty-second embodiment. This converter element is disposed within the cavity resonator of a laser diode pumped YAG laser as shown in FIG. 6. At this time, there is obtained the second harmonic wave 49 with an output of 10 mW when the laser diode 44 produces an output of 200 mW. To the contrary, the output of a second harmonic wave is measured when the optical wavelength converter element is disposed inside the cavity resonator of the laser diode pumped YAG laser 44, wherein the element is fabricated in the same manner as mentioned above, but without the foregoing heat treatment. The output of the resultant second harmonic wave is 1 mW when the laser diode 44 produces an output of 200 mW.

A temperature range suitable for the foregoing heat treatment will now be described. A plurality of LiNbO$_3$ crystals are prepared as a sample. In accordance with the same method as the fifteenth embodiment, domain reversals are formed on each crystal. These LiNbO$_3$ crystals undergo the foregoing heat treatment with a temperature varied in the range, from 100° to 1000° C., below the Curie point (1130° C.) of the crystals. The rate of temperature rise during the temperature treatment is 30° C./min, and the temperature holding time T is two hours. The heated crystals are naturally cooled.

When the sample crystals, each being heated at its own temperature as mentioned above, are examined by means of the polarizing microscope, it turns out, from each sample, that local variations in the refractive index of the domain reversals are eliminated, and the refractive index is equalized.

In the same manner as mentioned above, a bulk crystal type optical wavelength converter element is formed from each sample crystal. Like the aforementioned embodiments, each of these optical wavelength converter elements is disposed within the cavity resonator of the laser diode pumped YAG laser. Concerning the sample crystal having the heat treatment temperature T in the range from 100° C.$\leq$T$\leq$700° C., it is admittedly observed that a second harmonic wave, which acts as a blue light, is generated. There is obtained a second harmonic wave with an output of 10 mW when the laser diode produces an output of 200 mW. To the contrary, with regard to another sample having the heat treatment temperature T in the range of 700° C.<T<1000° C., there is not observed the generation of the second harmonic wave. In relation to the latter sample, from which the generation of the second harmonic wave is not observed, it turns out that no periodic domain reversals are observed, and the polarization directions of the domain reversals are changed due to the heat treatment.

Incidentally, when the sample is heated at a temperature less than 100° C. it is admittedly observed that local variations in the refractive index (a level difference in refractive index) of the domain reversal remain entirely by the examination using the polarizing microscope. Moreover, when this sample is disposed inside the cavity resonator of the laser diode pumped YAG laser in the manner as previously mentioned, there is admittedly observed the generation of the second harmonic wave which acts as a blue light, and there is obtained a second harmonic wave with a nominal output of 1.0 mW. This is attributed to the fact that the dispersion of the fundamental wave due to the level difference in refractive index causes internal losses to be increased. As a result of this, it is evident that the heat treatment below a temperature of 100° C. was of no effect.

As stated above, when the LiNbO$_3$ crystal is subjected to a heat treatment below the Curie point, a temperature T of the heat treatment should preferably be set within the range of 100° C.$\leq$T$\leq$700° C.

Meanwhile, there are also prepared a plurality of LiTaO$_3$ crystals, having a Curie point of 610° C. as a sample. In accordance with the same technique as used in the twenty second embodiment, domain reversals are formed on each crystal sample. The temperature range for heat treatment is defined, below a Curie point of 610° C., between 100° C. and 600° C. The rate of temperature rise during the temperature treatment is 30° C./min, and the temperature holding time T is two hours. The heated crystals are naturally cooled.

When the sample crystals, each being heated at its own temperature as mentioned above, are examined by means of the polarizing microscope, it turns out, from each sample, that local variations in the refractive index of the domain reversals are eliminated, and the refractive index is equalized.

In the same manner as mentioned above, a bulk crystal type optical wavelength converter element is formed from each sample crystal. Like the aforementioned embodiments, each of these optical wavelength converter elements is disposed within the cavity resonator of the laser diode pumped YAG laser. Concerning the sample crystal having the heat treatment temperature T in the range from 100° C.$\leq$T$\leq$600° C., it is admittedly observed that a second harmonic wave, which acts as a blue light, is generated. There is obtained a second harmonic wave with an output of 10 mW when the laser diode produces an output of 200 mW. To the contrary, with regard to another sample having the heat treatment temperature T in the range of 600° C.$\leq$T$\leq$610° C., there is not observed the generation of the second harmonic wave. In relation to the latter sample from which the generation of the second harmonic wave is not observed, it turns out that no periodic domain reversals are observed, and the polarization directions of the domain reversals are changed due to the heat treatment.

Incidentally, when the sample is heated at a temperature less than 100° C., it is admittedly observed that local variations in the refractive index (a level difference in refractive index) of the domain reversal remain entirely by the examination using the polarizing microscope. Moreover, when this sample is disposed inside the cavity resonator of the laser diode pumped YAG laser in the manner as previously mentioned, there is admittedly observed the generation of the second harmonic wave which acts as a blue light, and there is obtained a second harmonic wave with a nominal output of 1.0 mW. This is attributed to the fact that the dispersion of the fundamental wave due to the level difference in refractive index causes internal losses to be increased. As a result of this, it is evident that the heat treatment below a temperature of 100° C. was of no effect.

As stated above, when the LiTaO$_3$ crystal is subjected to a heat treatment below the Curie point, a temperature T of the heat treatment should preferably be set within the range of 100° C.$\leq$T$\leq$600° C.

A ferroelectric having the domain reversals, fabricated in accordance with this invention, can be used as an optical wavelength converter element for use in an external oscillator type laser by rendering the ferroelectric subjected to adequate grinding and coating processes. In this case, there is yielded effects and results similar to those obtained when the ferroelectric is used for the laser diode pumped solid-state laser.

It will be understood that the above description of the present invention is susceptible to various modifications, changes, and adaptations and that the same are intended to be comprehended within the meaning and range of equivalents of the appended claims.

What is claimed is:

1. A fabrication method for ferroelectric domain reversals, comprising the steps of:
    forming a proton-exchanged region in a set pattern on a ferroelectric which possesses a unipolarized nonlinear optical effect; and
    heating the ferroelectric while applying an external electric field to the proton-exchanged region, thereby fabricating local domain reversals.

2. A fabrication method for ferroelectric domain reversals, comprising the steps of:
    forming a Ti-diffused region in a set pattern on a ferroelectric which possesses a unipolarized nonlinear optical effect; and
    heating the ferroelectric while applying an external electric field to the Ti-diffused region, thereby fabricating local domain reversals.

3. A fabrication method for ferroelectric domain reversals, comprising the steps of:
    forming an outer diffused region in a set pattern on a ferroelectric which possesses a unipolarized nonlinear optical effect; and
    heating the ferroelectric while applying an external electric field to the outer diffused region, thereby fabricating local domain reversals.

4. A fabrication method for ferroelectric domain reversals, comprising the steps of:
    implanting ions or atoms in a set pattern into a ferroelectric, from one end surface thereof, which possesses a unipolarized nonlinear optical effect, so that an electric conductivity of implanted region is changed; and locally inverting directions of polarization at the implanted region or the remaining region sandwiched between the implanted region and the other opposite end surface by heating the ferroelectric with a step of applying an electric field between said one end surface and the other opposite end surface.

5. A fabrication method for ferroelectric domain reversals, comprising the steps of:
    irradiating light, at a wavelength enough to induce a photo refractive effect, in a set pattern over a ferroelectric which possesses a unipolarized nonlinear optical effect and the photorefractive effect; and
    transforming a region, where the photorefractive effect appears, into local domain reversals by applying an external electric field.

6. A fabrication method as defined in any one of the preceding claims 1 through 5, wherein the step of applying the electric field is applied by a corona electrical charging method.

7. A fabrication method as defined in any one of the preceding claims 1 through 5, wherein the step of applying the electric field includes applying a d.c. voltage or a pulse voltage through electrodes formed on both surfaces of the ferroelectrics.

8. A fabrication method as defined in any one of preceding claims 1 through 5, wherein the electric field applying step comprise a technique in which the ferroelectric is rapidly cooled after it has been heated, and an electric field is then applied utilizing surface electric charges produced by a pyroelectric effect.

9. A fabrication method for ferroelectric domain reversals, comprising the steps of:
    forming an electrode in a set pattern on one surface of a ferroelectric which possesses a unipolarized nonlinear optical effect;
    subjecting the ferroelectric to a corona electrical charging by means of the electrode and a corona wire disposed on the other opposite surface side of the ferroelectric;
    applying an electric charge to the region which has undergone the corona electrical charging; and transforming the region in opposition to the electrode of the ferroelectric into local domain reversals.

10. A fabrication method for ferroelectric domain reversals, comprising the steps of:
    forming an electrode in a set pattern on one surface of a ferroelectric which possesses a unipolarized nonlinear optical effect;
    rapidly cooling the ferroelectric after the ferroelectric has been heated with the electrode thereof grounded; and
    transforming the region in opposition to the electrode of the ferroelectric into local domain reversals by applying an electric field to the ferroelectric utilizing surface electric charges produced by the pyroelectric effect.

11. A fabrication method for ferroelectric domain reversals in which local domain reversals are formed by applying an external electric field onto a ferroelectric having a unipolarized nonlinear optical effect, the method characterized in that
    an electric field is applied to the ferroelectric in dry atmosphere or under vacuum.

12. A fabrication method as defined in claim 11, wherein the ferroelectric is a MgO—LiNb$_x$Ta$_{(1-x)}$O$_3$ ($0 \leq X \leq 1$) substrate.

13. A fabrication method as defined in claim 12, wherein the ferroelectric is a MgOLiNbO$_3$ substrate, and the ferroelectric is heated at a temperature below the Curie point after local domain reversals have been formed thereon.

14. A fabrication method as defined in claim 11, wherein the ferroelectric is a LiNb$_x$Ta$_{(1-x)}$O$_3$ ($0 \leq X \leq 1$) substrate.

15. A fabrication method as defined in claim 14, wherein the ferroelectric is heated at a temperature below the Curie point after local domain reversals have been formed on the ferroelectric.

16. A fabrication method as defined in claim 15, wherein the ferroelectric is a LiNbO$_3$ substrate, and wherein the heat treatment temperature is set in the range between 100° C. and 700° C.

17. A fabrication method as defined in claim 15, wherein the ferroelectric is a LiTaO$_3$ substrate, and wherein the heat treatment temperature is set in the range between 100° C. and 600° C.

* * * * *